United States Patent
Jeong (10) Patent No.: US 12,033,480 B2
(45) Date of Patent: Jul. 9, 2024

(54) IMAGE-BASED REAL-TIME INTRUSION DETECTION METHOD AND SURVEILLANCE CAMERA USING ARTIFICIAL INTELLIGENCE

(71) Applicant: ESCA CO., LTD., Gyeonggi-do (KR)

(72) Inventor: Tae Woong Jeong, Chungcheongnam-do (KR)

(73) Assignee: ESCA CO., LTD., Anyang-si (KR)

( * ) Notice: Subject to any disclaimer, the term of this patent is extended or adjusted under 35 U.S.C. 154(b) by 338 days.

(21) Appl. No.: 17/607,023

(22) PCT Filed: Apr. 23, 2020

(86) PCT No.: PCT/KR2020/005377
§ 371 (c)(1),
(2) Date: Oct. 27, 2021

(87) PCT Pub. No.: WO2020/235819
PCT Pub. Date: Nov. 26, 2020

(65) Prior Publication Data
US 2022/0215727 A1    Jul. 7, 2022

(30) Foreign Application Priority Data
May 17, 2019    (KR) .................. 10-2019-0058243

(51) Int. Cl.
| | | |
|---|---|---|
| *G08B 13/196* | (2006.01) | |
| *G06N 3/045* | (2023.01) | |
| *G06V 20/52* | (2022.01) | |
| *G06V 40/20* | (2022.01) | |

(52) U.S. Cl.
CPC ....... *G08B 13/19608* (2013.01); *G06N 3/045* (2023.01); *G06V 20/52* (2022.01);
(Continued)

(58) Field of Classification Search
CPC ........ G08B 13/19608; G08B 13/19656; G06V 20/52; G06V 40/23; G06V 2201/07; G06N 3/045
See application file for complete search history.

(56) References Cited

U.S. PATENT DOCUMENTS

| | | | |
|---|---|---|---|
| 10,922,547 B1 * | 2/2021 | Siminoff | H04N 23/661 |
| 2018/0227538 A1 * | 8/2018 | Wang | H04N 5/91 |

(Continued)

FOREIGN PATENT DOCUMENTS

| | | |
|---|---|---|
| KR | 10-2013-0105374 | 9/2013 |
| KR | 10-2015-0033047 | 4/2015 |

(Continued)

OTHER PUBLICATIONS

International Search Report for PCT/KR2020/005377 mailed on Jul. 29, 2020 and its English translation from WIPO (now published as WO 2020/235819).

(Continued)

*Primary Examiner* — Pinalben Patel
(74) *Attorney, Agent, or Firm* — Ladas & Parry, LLP (57) ABSTRACT

An image-based real-time intrusion detection method and a surveillance camera that use artificial intelligence are provided to sample a plurality of frames input at a first point in time, acquire a probability that at least one object corresponding to a type of a target object exists in an image of the respective sampled frames by using a first artificial neural network, adjust a sampling rate for a plurality of frames to be input at a second point in time after the first point in time according to processing time of each frame of the first artificial neural network required to acquire an existence probability of the at least one object, select each of the respective sampled frames as a frame of the target object according to a magnitude of the acquired probability, generate a movement trajectory of each object corresponding to
(Continued)

the type of the target object from the frames selected as the frame of the target object, and acquire an intrusion occurrence probability from the generated movement trajectory by using a second artificial neural network.

7 Claims, 6 Drawing Sheets

(52) U.S. Cl.
CPC ....... *G06V 40/23* (2022.01); *G08B 13/19656* (2013.01); *G06V 2201/07* (2022.01)

(56) References Cited

U.S. PATENT DOCUMENTS

2019/0095705 A1* 3/2019 Yu .................. G06F 18/2135
2021/0096216 A1* 4/2021 Rigazio ................. G06F 18/214
2021/0365707 A1* 11/2021 Mao ..................... G06V 10/235
2023/0087722 A1* 3/2023 Ren ........................ G06N 3/045
706/26

FOREIGN PATENT DOCUMENTS

| KR | 10-2017-0032033 | 3/2017 |
| KR | 10-1773127 | 8/2017 |
| KR | 10-2019-0046351 | 5/2019 |

OTHER PUBLICATIONS

Written Opinion of the International Searching Authority for PCT/KR2020/005377 mailed on Jul. 29, 2020 and its English machine translation by Google Translate (now published as WO 2020/235819).

* cited by examiner

IMAGE-BASED REAL-TIME INTRUSION DETECTION METHOD AND SURVEILLANCE CAMERA USING ARTIFICIAL INTELLIGENCE

CROSS-REFERENCE TO RELATED APPLICATIONS

This application is the U.S. national phase of PCT Application No. PCT/KR2020/005377 filed on Apr. 23, 2020, which claims priority to Korean Patent Application No. 10-2019-0058243, filed on May 17, 2019, the entire contents of which are incorporated herein by reference.

TECHNICAL FIELD

The present invention relates to a method and a surveillance camera for detecting intrusion into a surveillance region in real time based on an image of the surveillance region.

BACKGROUND

Most of the image surveillance systems currently in operation are not operated to prevent crimes or incidents in advance by detecting intrusions in real time, but mainly used to reveal full pictures of the crimes or incidents by using stored images after the incidents occur or to identify intruders. However, if it is not possible to prevent intrusions of unauthorized persons in advance into important national facilities such as national borders, airfields, power plants, ports, nuclear power plant facilities, and stockpiling bases, or regions prohibited for specific purposes such as industrial and public facilities and accident prevention, national disasters such as terrorism or accidents such as damage to protection may occur, and thus, For these facilities or areas, the role of blocking or preventing accidents by detecting and alerting in real time intrusions into the facilities or regions.

In most image surveillance systems, dozens to hundreds of closed circuit television (CCTV) surveillance cameras are installed in the field, and when images of the surveillance cameras are transmitted to a server of a control center, dozens to hundreds of monitors or large screens installed in the control center display the images captured by dozens to hundreds of cameras in split screens or sequential screens. However, it is actually impossible for a small number of persons working at the control center to detect intruders through visual observation from the numerous images. In order to make this possible, it is necessary to greatly increase the number of surveillance persons working in the control center to minimize the number of surveillance images per person, but there are many practical difficulties such as increasing labor costs and expansion of accommodation facilities.

Recently, a technology for detecting an intrusion in real time by using an artificial intelligence technique has been in the spotlight. For example, Korean Patent No. 10-0459767 entitled "Incursion detection system using the hybrid neural network and incursion detection method using the same" discloses a technology that does not need an intrusion detection pattern database because an intrusion is detected by using a hybrid neural network, and thus, there is no need for pattern matching for intrusion detection, resulting in great reduction in processing time. Korean Patent No. 10-1808587 entitled "Intelligent integration visual surveillance control system by object detection and tracking and detecting abnormal behaviors" discloses a technology that may identify and track abnormal objects captured by cameras in real time by using an object recognition technology.

However, the intrusion detection and so on according to the related art may be driven by a server with excellent hardware specifications due to an artificial intelligence load but may not be driven by a surveillance camera with low hardware specifications. Accordingly, in the related art, a server of a control center receives an image captured by a surveillance camera and performs intrusion detection based on the image. However, there are problems in that real-time intrusion detection may be reduced due to time required for communication between the surveillance camera and the server and accuracy of intrusion detection may be reduced in the process of image compression and restoration.

SUMMARY OF INVENTION

Technical Problem

The present invention provides an image-based real-time intrusion detection method and a surveillance camera that may greatly increase accuracy of an intrusion occurrence probability in a surveillance region by using two artificial neural networks step by step to detect an intrusion in the surveillance region and may acquire in real time the intrusion occurrence probability for an image obtained by capturing a surveillance region by using a surveillance camera with low hardware specifications. The present invention is not limited to the technical problems described above, and another technical problems may be derived from the following description.

Solution to Problem

An image-based real-time intrusion detection method according to one aspect of the present invention includes a step of sampling a plurality of frames input at a first point in time; a step of acquiring a probability that at least one object corresponding to a type of a target object exists in an image of the respective sampled frames by using a first artificial neural network; a step of adjusting a sampling rate for a plurality of frames to be input at a second point in time after the first point in time according to processing time of each frame of the first artificial neural network required to acquire an existence probability of the at least one object; a step of selecting each of the respective sampled frames as a frame of the target object according to a magnitude of the acquired probability; a step of generating a movement trajectory of each object corresponding to the type of the target object from the frames selected as the frame of the target object; and a step of acquiring an intrusion occurrence probability from the generated movement trajectory by using a second artificial neural network.

In the step of adjusting the sampling rate, processing time of each frame of the first artificial neural network may be calculated from a difference between a point in time at which an image of the respective sampled frames is input to the first artificial neural network and a point in time at which an existence probability of at least one object in the image of each of the sampled frames is output from the first artificial neural network, and the sampling rate is adjusted in inverse proportion to the processing time of each frame of the first artificial neural network.

In the step of generating the movement trajectory of each object, the movement trajectory may be generated by using at least one object tracking algorithm, and the adjusted sampling rate is readjusted according to processing time of each frame of the object tracking algorithm required to generate the movement trajectory.

In the step of generating the movement trajectory of each object, a movement trajectory of at least one part of each object corresponding to the type of the target object may be generated by using at least one object tracking algorithm, and in the step of acquiring the intrusion occurrence probability, the intrusion occurrence probability may be acquired from an output of the second artificial neural network by inputting the generated movement trajectory of each part to the second artificial neural network.

The image-based real-time intrusion detection method may further include a step of adjusting the number of movement trajectories of each part input to the second artificial neural network according to processing time of each frame of the second artificial neural network required to acquire the intrusion occurrence probability.

In the step of adjusting the number of movement trajectories of each part, a current number of movement trajectories of each part input to the second artificial neural network may be maintained when the processing time of each frame of the second artificial neural network is within a reference time range, and any one of the movement trajectories of each part input to the second artificial neural network may be removed when the processing time of each frame of the second artificial neural network is greater than the reference time range, and a movement trajectory of a new part may be added to the movement trajectory of each part input to the second artificial neural network when the processing time of each frame of the second artificial neural network is less than the reference time range.

The image-based real-time intrusion detection method may further include a step of converting a color image of the respective sampled frames into a black-white image representing an outline of at least one object, wherein, in the step of acquiring a probability that the at least one object exists, a probability that at least one object corresponding to a type of a target object exists in the converted black-white image may be acquired by using the first artificial neural network.

A surveillance camera according to another aspect of the present invention includes a sampler that samples a plurality of frames input at a first point in time; an object identification unit that acquires a probability that at least one object corresponding to a type of a target object exists in an image of the respective sampled frames by using a first artificial neural network; a control unit that adjusts a sampling rate for a plurality of frames to be input at a second point in time after the first point in time according to processing time of each frame of the first artificial neural network required to acquire an existence probability of the at least one object and that selects each of the respective sampled frames as a frame of the target object according to a magnitude of the acquired probability; a trajectory generation unit that generates a movement trajectory of each object corresponding to the type of the target object from the frames selected as the frame of the target object; and an intrusion detection unit that acquires an intrusion occurrence probability from the generated movement trajectory by using a second artificial neural network.

Advantageous Effects

Accuracy of detecting an intrusion into a surveillance region may be greatly increased by acquiring a probability that at least one object corresponding to the type of a target object exists by using a first artificial neural network, and by acquiring an intrusion occurrence probability from a movement trajectory by using a second artificial neural network, that is, by using two artificial neural networks step by step to detect the intrusion into the surveillance region. Above all, by adjusting a sampling rate for a plurality of frames to be input according to processing time of each frame of the first artificial neural network, an intrusion occurrence probability for an image obtained by capturing the surveillance region may be acquired in real time even when a surveillance camera with low hardware specifications uses two artificial neural networks.

In addition, even in a case where an object tracking algorithm is used in addition to two artificial neural networks, a surveillance camera may acquire in real time an intrusion occurrence probability for an image obtained by capturing a surveillance region by generating a movement trajectory of each object by using at least one object tracking algorithm and readjusting a sampling rate for a plurality of frames to be input in the future according to processing time of each frame of an object tracking algorithm required to generate the movement trajectory of each object.

In addition, accuracy of intrusion detection may be precisely adjusted according to hardware specifications of the surveillance camera 10 such that an intrusion occurrence probability for an image obtained by capturing the surveillance region may be acquired with the highest accuracy in real time by inputting a movement trajectory of at least one part of each object to a second artificial neural network to acquire the intrusion occurrence probability from an output of a second artificial neural network and by adjusting the number of movement trajectories of each part input to the second artificial neural network according to processing time of each frame of the second artificial neural network required to acquire the intrusion occurrence probability.

The present invention is not limited to the effects described above, and other effects may be derived from the following description.

BEST MODE FOR INVENTION

Hereinafter, an embodiment of the present invention is described in detail with reference to the drawings. An embodiment of the present invention to be described below relates to an image-based real-time intrusion detection method and a surveillance camera that may use two artificial neural networks step by step to detect an intrusion into a surveillance region, thereby not only greatly increasing accuracy of an intrusion occurrence probability in the surveillance region but also acquiring an intrusion cocurrent probability for an image obtained by capturing a surveillance region in real time from a surveillance camera with low hardware specifications. Hereinafter, the image-based real-time intrusion detection method and the surveillance camera as stated above may also be briefly referred to as an "image-based real-time intrusion detection method" and a "surveillance camera".

Figure 1:
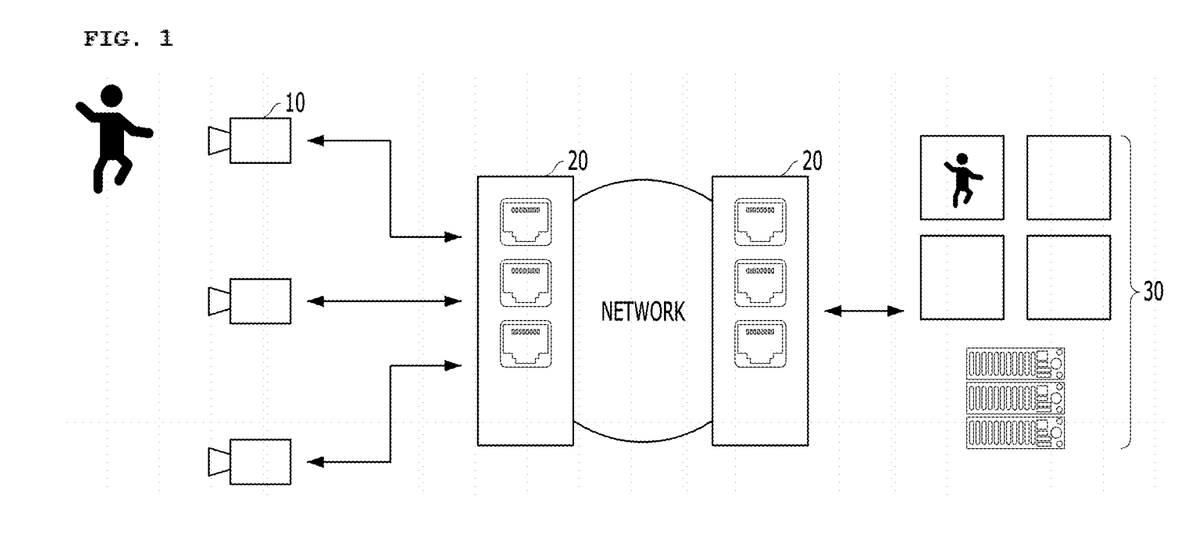
FIG. 1 is a configuration diagram of an image surveillance system according to an embodiment of the present invention.

FIG. 1 is a configuration diagram of an image surveillance system according to an embodiment of the present invention. Referring to FIG. 1, the image surveillance system according to the present embodiment includes a plurality of surveillance cameras 10 including the surveillance cameras 10 illustrated in FIG. 1, a plurality of hubs 20, and a server 30. The plurality of surveillance cameras 10 are sporadically installed in surveillance regions and transmit images captured thereby according to the embodiment described above to the server 30 through a network. In a case where the surveillance region is very narrow, only one surveillance camera 10 may also be installed. The plurality of hubs 20 enable network communication between the plurality of surveillance cameras 10 and the servers 30 by connecting the plurality of surveillance cameras 10 to the network and connecting the server 30 to the network.

The server 30 is installed in a control center to receive color images transmitted through the network from the plurality of surveillance cameras 10 and displays the received color images to a user. The server 30 includes a plurality of monitors corresponding to the plurality of surveillance cameras 10 on a one-to-one basis. The monitor assigned to each surveillance camera displays an image captured by the surveillance camera 10. As described below, each monitor simultaneously displays a certain alarm in addition to the captured image of the surveillance camera 10, and thus, a manager of the control center may know which surveillance camera to observe the captured image. This allows the manager of the control center to focus only on an image related to occurrence of crime or incident in the surveillance region, and thus, only a small number of persons of the control center may prevent crimes or incident from occurring in the surveillance region in advance.

Figure 2:
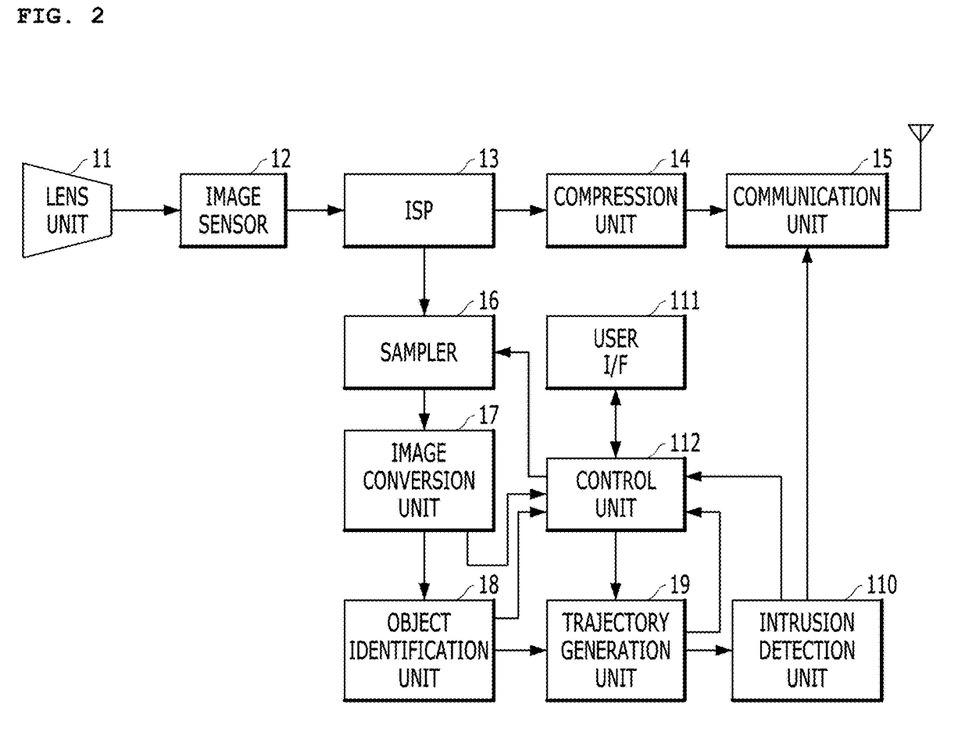
FIG. 2 is a configuration diagram of a surveillance camera 10 illustrated in FIG. 1.

FIG. 2 is a configuration diagram of the surveillance camera 10 illustrated in FIG. 1. Referring to FIG. 2, the surveillance camera 10 according to the present embodiment includes a lens unit 11, an image sensor 12, an image signal processor (ISP) 13, a compression unit 14, a communication unit 15, a sampler 16, an image conversion unit 17, an object identification unit 18, a trajectory generation unit 19, an intrusion detection unit 110, a user interface 111, and a control unit 112. The surveillance camera 10 according to the present embodiment may further include a housing, a filter, a memory, and so on in addition to the components described above, but in order to prevent features of the present embodiment from being blurred, descriptions on general components of the camera that are not related to the features of the present embodiment are omitted. Some of the components described above may be implemented by combinations of a microprocessor, a memory in which a computer program is stored, and so on.

Among the components of the surveillance camera 10, the sampler 16, the image conversion unit 17, the object identification unit 18, the trajectory generation unit 19, the intrusion detection unit 110, the user interface 111, and the control unit 112 may be removed from the surveillance camera 10 to be added to the server 30 as components of the server 30. In this case, the surveillance camera 10 only serves to image a surveillance region and transmit a result of image to the server 30, and the server 30 serves to detect intrusion of an outsider from the images transmitted from the surveillance camera 10. Since hardware performance of the server 30 is very excellent compared to hardware performance of the surveillance camera 10, intrusion detection accuracy may be greatly increased in a case where components as described above are added to the server 30 as described above, but in a case where a communication environment between the surveillance camera 10 and the server 30 is poor or a communication failure occurs, real-time intrusion detection may not be guaranteed.

The lens unit 11 includes at least one lens. In general, a surveillance camera supports a zoom-in function of enlarging and imaging a target object when capturing a moving object and a zoom-out function of widening all imaging regions, and in order to enable the zoom-in function and the zoom-out function, the lens unit 11 may include a plurality of lenses. For example, the lens unit 11 may include a cylindrical barrel, a convex lens which is built therein and may change a focal length, a concave lens, and another convex lens. Since the lens unit 11 is not related to the features of the present embodiment, further detailed description thereon is omitted to prevent blurring of the features of the present embodiment.

The image sensor 12 converts light passing through the lens unit 11 into an electrical signal. The image sensor 13 may be classified into a charge coupled device (CCD) sensor and a complementary metal-oxide semiconductor (CMOS) sensor. The image sensor 13 responds to both infrared and visible light and converts the infrared or the visible light into an electrical signal. In a case where a color image is generated from a signal output from the image sensor 13, infrared irradiated to the image sensor 13 acts as a factor degrading image quality of the color image, and in a case where a black-white image is generated from a signal output from the image sensor 13, visible light irradiated to the image sensor 13 acts as a factor degrading image quality of the black-white image. A hardware filter may also be inserted between the lens unit 11 and the image sensor 12 to block any one of an infrared band and a visible light band of the light passing through the lens unit 11 and transmit the other.

The ISP 13 generates a color image of a plurality of frames per second, for example, 60 frames per second, from the electrical signal converted by the image sensor 12, and outputs the generated color images for each frame. Each frame consists of a frame header and image data. Numbers of respective frames are recorded in the frame header to be used to distinguish the frames. Basically, the ISP 13 generates a color image having a low voltage differential signaling (LVDS) format by interpolating values of respective pixels of a Bayer pattern image of a signal output from the image sensor 12. The ISP 13 may additionally perform image enhancement processing such as removing noise from the generated color image, correcting backlight, and adjusting a color to be closer to a natural color.

Here, a color image of 60 frames per second is only an example, and the ISP 13 may also generate a color image of 30 frames per second from the electrical signal converted by the image sensor 12 and may also generate a color image of 120 frames per second from the converted electrical signal. Meanwhile, the ISP 13 may also generate a black-white image from the electrical signal converted by the image sensor 12. Hereinafter, the present embodiment is described on the assumption that a color image of 60 frames per second is generated by the ISP 13.

The compression unit 14 compresses the color image generated by the ISP 13. The compression unit 16 may compress the color image generated by the ISP 13 according to various codecs such as H.264 and a high efficiency video codec (HEVC). The communication unit 15 transmits the image compressed by the compression unit 14 to the server 30, which displays an image captured by the surveillance camera 10 to a user, for example, a computer of a control center. Such an image display device and the surveillance camera 10 communicate with each other through a network such as the Internet or a local area network (LAN) when far apart from each other. The communication unit 15 may transmit the image compressed by the compression unit 14 to the image display device through a network according to transmission control protocol/internet protocol (TCP/IP). Meanwhile, the communication unit 15 may also transmit the color image generated by the ISP 13 as it is without compression.

The sampler 16 samples frames output from the ISP 13 at a sampling rate according to a control of the controller 112. The image conversion unit 17 converts a color image of each frame sampled by the sampler 16 into a black-white image representing an outline of at least one object. The object identification unit 18 acquires a probability that at least one object corresponding to the type of a target object input to the user interface 111 exists in the black-white image converted by the image conversion unit 17 by using a first artificial neural network.

The trajectory generation unit 19 uses at least one object tracking algorithm to generate a movement trajectory of at least one part of each object corresponding to the type of a target object input to the user interface 111 from frames selected as frames of the target object by the control unit 112. The intrusion detection unit 110 acquires an intrusion occurrence probability for a surveillance region by the surveillance camera 10 from the movement trajectory of each part generated by the trajectory generation unit 19 by using a second artificial neural network. The user interface 111 receives information for setting an intrusion detection environment from a user of the surveillance camera 10.

The control unit 112 adjusts a sampling rate of the sampler 16 according to processing time of each frame of the first artificial neural network and processing time of each frame of an object tracking algorithm and controls an operation of the sampler 16 such that sampling is performed at the adjusted sampling rate described above. In addition, the controller 112 adjusts the number of movement trajectories for each part input to the second artificial neural network according to the processing time of each frame of the second artificial neural network and controls an operation of the trajectory generation unit 19 such that the adjusted number of movement trajectories is input to the second artificial neural network.

As described above, the present embodiment may greatly improve intrusion detection accuracy in a surveillance region by using two artificial neural networks step by step for intrusion detection in the surveillance region. Among the artificial neural networks, a convolutional neural network (CNN) has a structure suitable for image learning. That is, the CNN has a structure in which a convolution part that extracts image features is attached to a front of each traditional artificial neural network. Hereinafter, an embodiment is described in which the first artificial neural network and the second artificial neural network are designed as CNNs.

Figure 3:
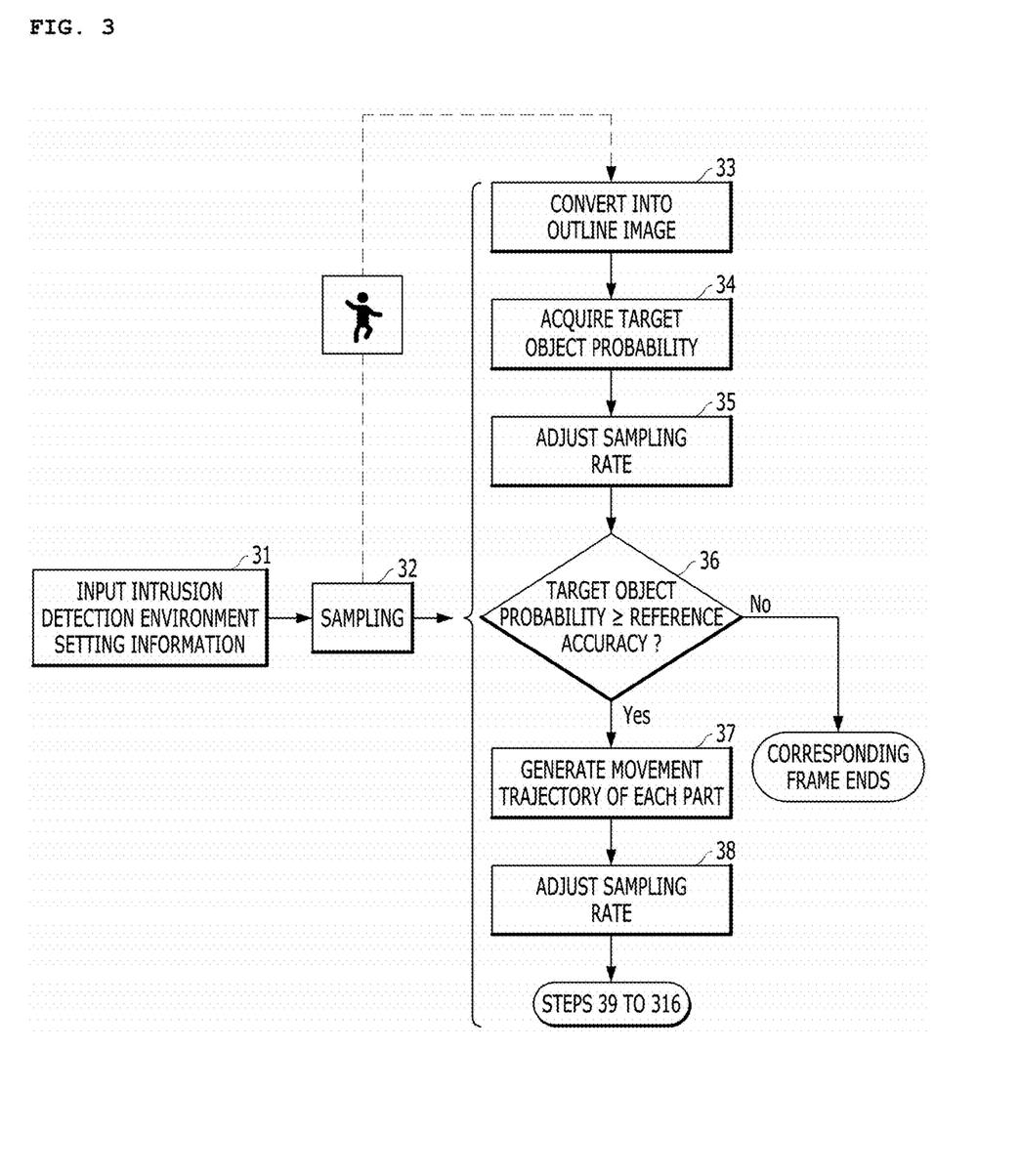
FIGS. 3 and 4 are flowcharts of an image-based real-time intrusion detection method according to an embodiment of the present invention.
Figure 4:
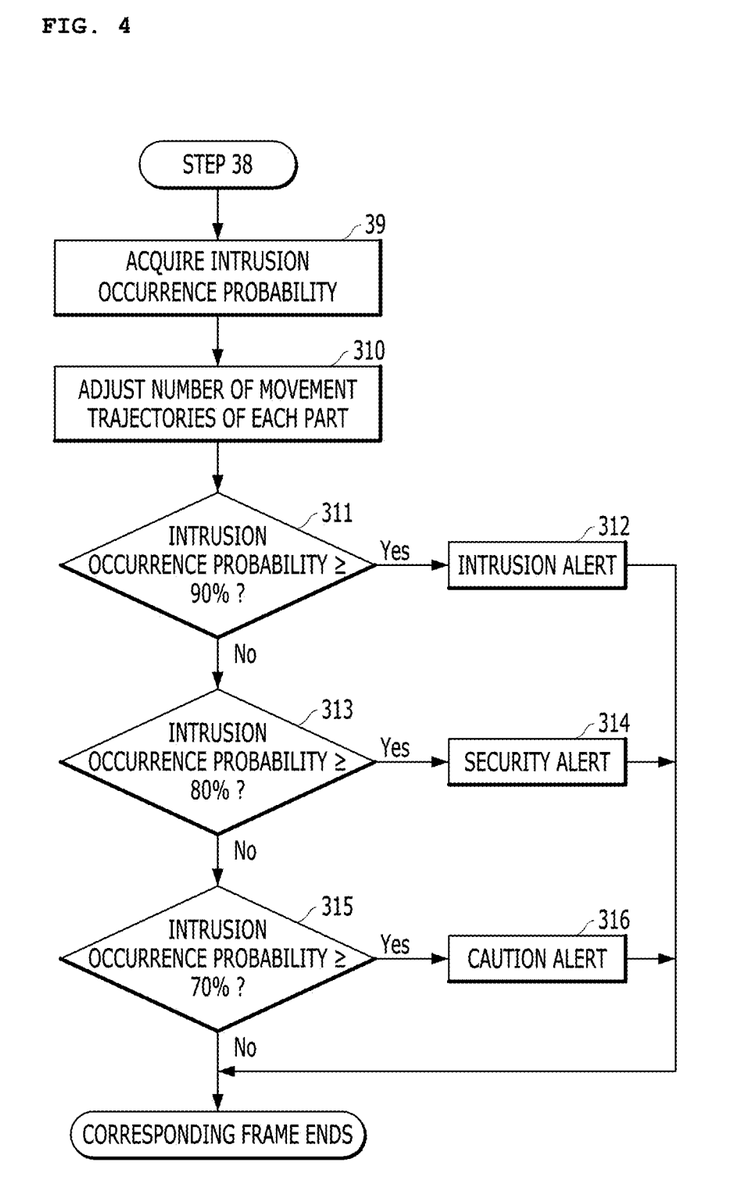

FIGS. 3 and 4 are flowcharts of the image-based real-time intrusion detection method according to the embodiment of the present invention. Referring to FIGS. 3 and 4, the image-based real-time intrusion detection method according to the present embodiment includes steps are processed in time series by the surveillance camera 10 illustrated in FIG. 2. Hereinafter, components of the surveillance camera 10 illustrated in FIG. 2 are described in detail. Even if omitted below, the contents described above with respect to the surveillance camera 10 illustrated in FIGS. 1 and 2 are also applied to the real-time intrusion detection method to be described below.

In step 31, the user interface 111 receives information for setting an intrusion detection environment from a user of the surveillance camera 10. The information for setting the intrusion detection environment includes any one of a plurality of types of a target object and reference accuracy of the target object. For example, the types of the target object include a person, a vehicle, and so on. The information for setting the intrusion detection environment further includes an intrusion detection region, an intrusion line, an intrusion direction, and so on. When a manager of the server 30 located at a remote location of the surveillance camera 10 inputs the information for setting the intrusion detection environment to the server 30, the communication unit 15 may also receive information for setting the intrusion detection environment from the server 30.

In step 32, the sampler 16 samples 60 frames per second currently input from the ISP 13 at a sampling rate adjusted by the controller 112. The 60 frames per second currently input indicate 60 frames per second including the currently input frames, and the sampler 16 may or may not output the currently input frames according to the sampling rate. For example, the sampler 16 may extract 1 to 60 frames per second from 60 frames per second generated by the ISP 13 under the control of the controller 112. That is, the sampler 16 may also extract 1 frame per second from the 60 frames per second by sampling 60 frames per second at a sampling rate of "1" or may also extract 60 frames per second from the 60 frames per second by sampling 60 frames per second at a 60 sampling rate. In the latter case, the sampler 16 serves to transmit 60 frames per second generated by the ISP 13 to the image conversion unit 17 as it is.

The sampler 16 outputs the respective sampled frames one by one, and steps 33 to 316 to be described below are repeated for each frame sampled by the sampler 16. As described below, a sampling rate of the sampler 16 is changed according to whether or not each frame output from the sampler 16 is processed in real time in steps 33 to 316. That is, a time interval between frames output from the sampler 16 changes depending on whether or not each frame output from the sampler 16 is processed in real time in steps 33 to 316. As a result, the time interval between frames output from the sampler 16 is continuously updated such that each frame output from the sampler 16 may be processed in real time in steps 33 to 316.

In step 33, the image conversion unit 17 converts a color image of each frame sampled by the sampler 16 into a black-white image representing an outline of at least one object. Hereinafter, the black-white image representing the outline of at least one object may be simply referred to as an "outline image". As described below, in more detail, the image conversion unit 17 may detect the outline of at least one object from the color image of each frame, set values of pixels located in the detected outline to "1", set values f the remaining pixels to "0", thereby converting the color image of each frame into an outline image. In relation to an outline detection of an object, there are various algorithms known to those skilled in the art to which the present embodiment belongs, and detailed descriptions thereof are omitted.

As described below, the black-white image converted by the image conversion unit 17 is input to a first CNN 180 for identifying the type of each object in the image of each frame. In the color image, each pixel is represented by three valued of red green blue (RGB), and in the black-white image, each pixel is represented by only one value of contrast. In the present embodiment, in order to increase a processing speed for each frame of the first CNN 180, a black-white image converted therefrom is input to the first CNN 180 instead of a color image. In particular, the amount of image data of a black-white image representing an outline of an object is greatly reduced compared to a black-white image representing the object, and thus, the processing speed for each frame of the first CNN 180 may be further increased.

In step 34, the object identification unit 18 acquires a probability that at least one object corresponding to the type of a target object input in step 31 exists in the black-white image converted in step 33 by using the first CNN 180. In more detail, the object identification unit 18 inputs the type of the target object input in step 31 and the black-white image converted in step 33 to the first CNN 180, thereby acquiring a probability that at least one object corresponding to the type of the target object input to the first CNN 180 from an output of the first CNN 180 exists in the black-white image input to the first CNN 180. For example, in a case where the type of the target object input in step 31 is a person, the object identification unit 18 acquires a probability that at least one object correspond to the person exists in the black-white image input to the first CNN 180 from the output of the first CNN 180.

Here, the first CNN 180 refers to a CNN learned by inputting many outline images to an input layer and inputting the type of at least one object in each outline image input as described above to an output layer. When the type of the target object input in step 31 and the black-white image converted in step 33 are input to the first CNN 180, the first CNN 180 outputs a probability, as a response to the input, that at least one object corresponding to the type of the target object exists in the black-white image having a frame number and a frame of the number.

In step 35, the control unit 112 controls a sampling rate of the sampler 16 for 60 frames per second to be input at the next point in time after the current point in time according to a frame-by-frame processing time of the first CNN 180 required to acquire a probability whether or not there is an object in step 34. 60 frames per second to be input at the next point in time may indicate 60 frames per second including frames to be input at the next point in time and may be new one frame or several new frames added to the currently input 60 frames per second according to the frame-by-frame processing speed of the surveillance camera 10.

Figure 5:
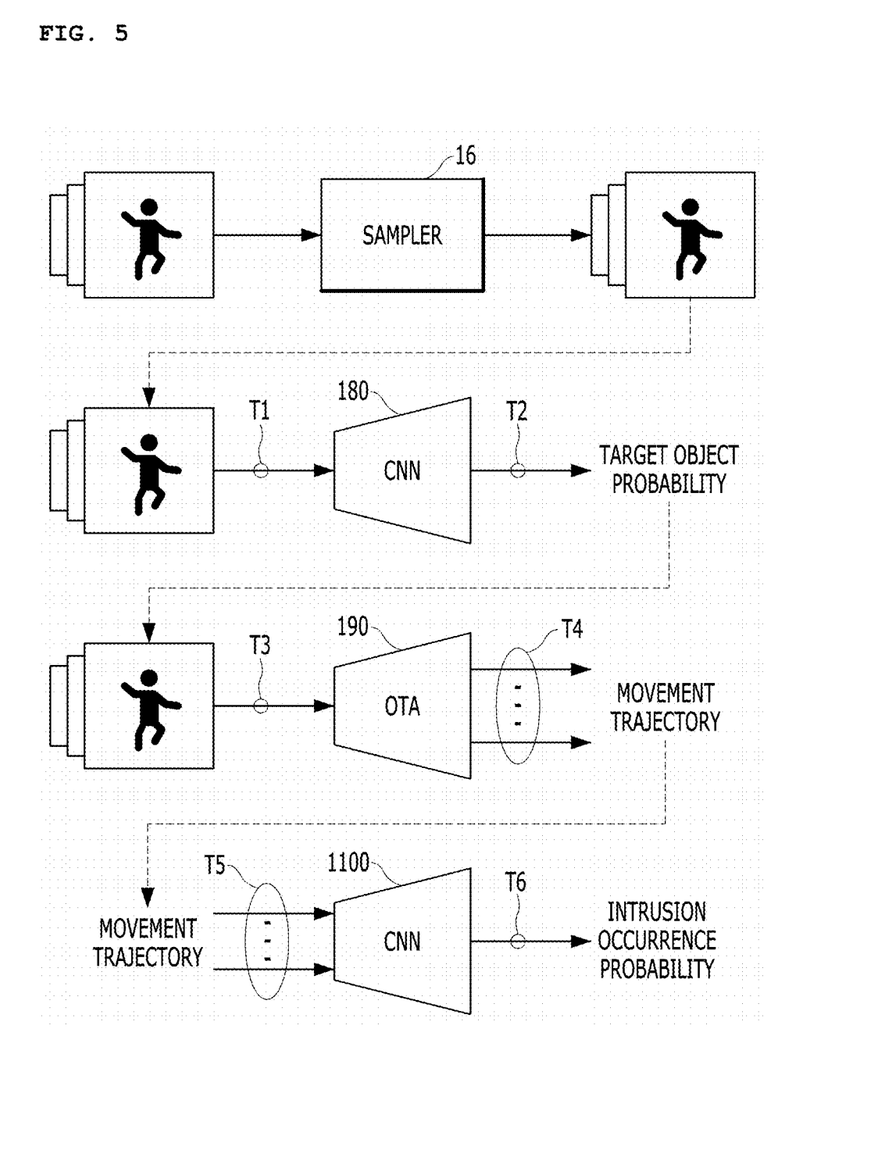
FIG. 5 is an example diagram for implementing the real-time intrusion detection method illustrated in FIG.

FIG. 5 is an example implementation diagram of the real-time intrusion detection method illustrated in FIG. 3. FIG. 5 is a diagram illustrating a configuration in which the surveillance camera 10 having very poor hardware performance compared to the server 30 previously served to perform real-time intrusion detection enables real-time intrusion detection for a color image of 60 frames per second generated by the ISP 13.

Referring to FIG. 5, the controller 112 calculates processing time of each frame of the first CNN 180 from a difference between a point in time "T1" at which the black-white image converted in step 33 is input to the first CNN 180 and a point in time "T2" at which the probability for the black-white image is output from the first CNN 180 in step 34, and adjusts a sampling rate of the sampler 16 in inverse proportion to the processing time of each frame of the first CNN 180 calculated as described above. As soon as the sampling rate is adjusted by the control unit 112, the sampler 16 performs sampling at the adjusted sampling rate. Here, the probability for the black-white image indicates a probability that at least one object corresponding to the type of a target object input to the first CNN 180 exists in the black-white image.

That is, when the processing time of each frame of the first CNN 180 is within a reference time range of the first CNN 180, the control unit 112 maintains the current sampling rate of the sampler 16, and when the processing time of each frame of the first CNN 180 is greater than the reference time range of the first CNN 180, the sampling rate of the sampler 16 is reduced by a unit amount, for example, by one, and when the processing time of each frame of the first CNN 180 is less than the reference time range of the CNN 180, the sampling rate of the sampler 16 is increased by the unit amount. Here, the reference time range of the first CNN 180 is set not only to enable real-time intrusion detection for a color image of 60 frames per second generated by the ISP 13 but also to enable the most frames to be input to the first CNN 180 in consideration of hardware specifications of the surveillance camera 10, for example, performance of a microprocessor, and so on.

In step 36, the controller 112 selects each frame sampled by the sampler 16 as a frame of a target object according to a magnitude of a probability acquired in step 34. In more detail, the controller 112 compares the probability acquired in step 34 with reference accuracy of a target object input in step 31. Next, when the probability acquired in step 34 is greater than or equal to the reference accuracy of the target object input in step 31, the controller 112 selects each frame having the probability greater than or equal to the reference accuracy of the target object input in step 31 as a frame of the target object. When the frame of the target object is selected, the processing proceeds to step 37, and when the probability acquired in step 34 is less than the reference accuracy of the target object input in step 31, a procedure for the corresponding frame ends. That is, a procedure for a frame with accuracy less than the reference accuracy ends.

In step 37, the trajectory generating unit 19 generates a movement trajectory of at least one part of each object corresponding to the type of a target object input in step 31 from frames selected as a frame of the target object in step 36 by using at least one object tracking algorithm 190. In step 36, as the frames selected as frames of the target object are accumulated, a length of the movement trajectory of each object is increased. For example, the algorithm for tracking an object in real time includes a mean-shift algorithm, a cam-shift algorithm, or so on. The object tracking algorithm is a technique known to those skilled in the art to which the present embodiment belongs, detailed descriptions thereof are omitted. According to the present embodiment, in a case where the number of parts of each object is plural, a plurality of object tracking algorithms may be simultaneously performed as many as the number.

For example, a movement trajectory of at least one part of each object may include a movement trajectory of a person's central part, a movement trajectory of a person's right hand, a movement trajectory of a person's right foot, and so on. In the present embodiment, the movement trajectory of the person's central part is a movement trajectory of a central point of a square box surrounding the person's whole body with the smallest size, and the movement trajectory of the person's right hand is a movement trajectory of a center point of a square box surrounding the person's right hand with the smallest size, and the movement trajectory of the person's right foot is a movement trajectory of a central point of a square box surrounding the person's right foot with the smallest size. That is, the trajectory generation unit 19 generates at least one dot-to-dot movement trajectory representing at least one part of each object corresponding to the type of a target object input in step 31 in a black-white image of a frame converted in step 33.

In step 38, the controller 112 adjusts a sampling rate of the sampler 16 according to the processing time of each frame of the object tracking algorithm 190 required to generate the movement trajectory in step 37. Referring to FIG. 5, the controller 112 calculates the processing time of each frame of the object tracking algorithm 190 from a difference between a point in time "T3" at which each frame selected as a frame of a target object in step 36 is input to the object tracking algorithm 190 and a point in time "T4" at which a movement trajectory of each part of each frame is output from the object tracking algorithm 190 in step 37, and readjusts the sampling rate adjusted in step 35 in inverse proportion to the processing time of each frame of the object tracking algorithm 190 calculated as described above. Here, the movement trajectory of each part of each frame indicates a movement trajectory with each frame as the last frame.

As soon as the sampling rate is readjusted by the controller 112, the sampler 16 performs sampling at the readjusted sampling rate. Accordingly, even in a case where an object tracking algorithm is used in addition to the two CNNs, the surveillance camera 10 may acquire an intrusion occurrence probability for an image obtained by capturing a surveillance region. According to the present embodiment, the sampling rate is adjusted twice in steps 35 and 38, and the present embodiment may be modified to have a structure in which the sampling rate is adjusted only in any of the two steps.

That is, when the processing time of each frame of the object tracking algorithm 190 is within the reference time range of the object tracking algorithm 190, the control unit 112 maintains the current sampling rate of the sampler 16, and when the processing time of each frame of the object tracking algorithm 190 is greater than the reference time range of the object tracking algorithm 190, the control unit 112 reduces the sampling rate of the sampler 16 by a unit amount, and when the processing time of each frame of the object tracking algorithm 190 is less than the reference time range of the object tracking algorithm 190, the control unit 112 increases the sampling rate of the sampler 16 by a unit amount. Here, the reference processing time of the object tracking algorithm 190 is set not only to enable real-time intrusion detection for a color image of 60 frames per second generated by the ISP 13 but also to enable the most frames to be input to the first CNN 180 in consideration of hardware specifications of the surveillance camera 10, for example, performance of a microprocessor, and so on.

In step 39, the intrusion detection unit 110 acquires an intrusion occurrence probability for a surveillance region of by the surveillance camera 10 from the movement trajectory of each part generated in step 37 by using the second CNN 1100. In more detail, the intrusion detection unit 110 inputs the movement trajectory of each part generated in step 37 to the second CNN 1100, thereby acquiring the intrusion occurrence probability for a surveillance region by the surveillance camera 10 from an output of the second CNN 1100. For example, when the type of a target object input in step 31 is a person, the object identification unit 18 acquires a probability that the movement trajectory of each part input to the second CNN 1100 from the output of the second CNN 1100 corresponds to an intruder's intrusion pattern, that is, the intrusion occurrence probability.

Here, the second CNN 1100 refers to a CNN learned by inputting many movement trajectories to an input layer and inputting, to an output layer, whether or not each of the movement trajectories input in this way corresponds to an intrusion pattern. When the movement trajectory of each part generated in step 37 is input to the second CNN 1100, the second CNN 1100 outputs a probability that the movement trajectory of each part generated in step 37 corresponds to the intruder's intrusion pattern as a response to the input. The intrusion detection unit 110 may filter the movement trajectory of each part generated in step 37 according to an intrusion detection region, an intrusion line, and an intrusion direction which are input to the user interface 111 and may input the filtered movement trajectory of each part to the second CNN 1100.

Figure 6:
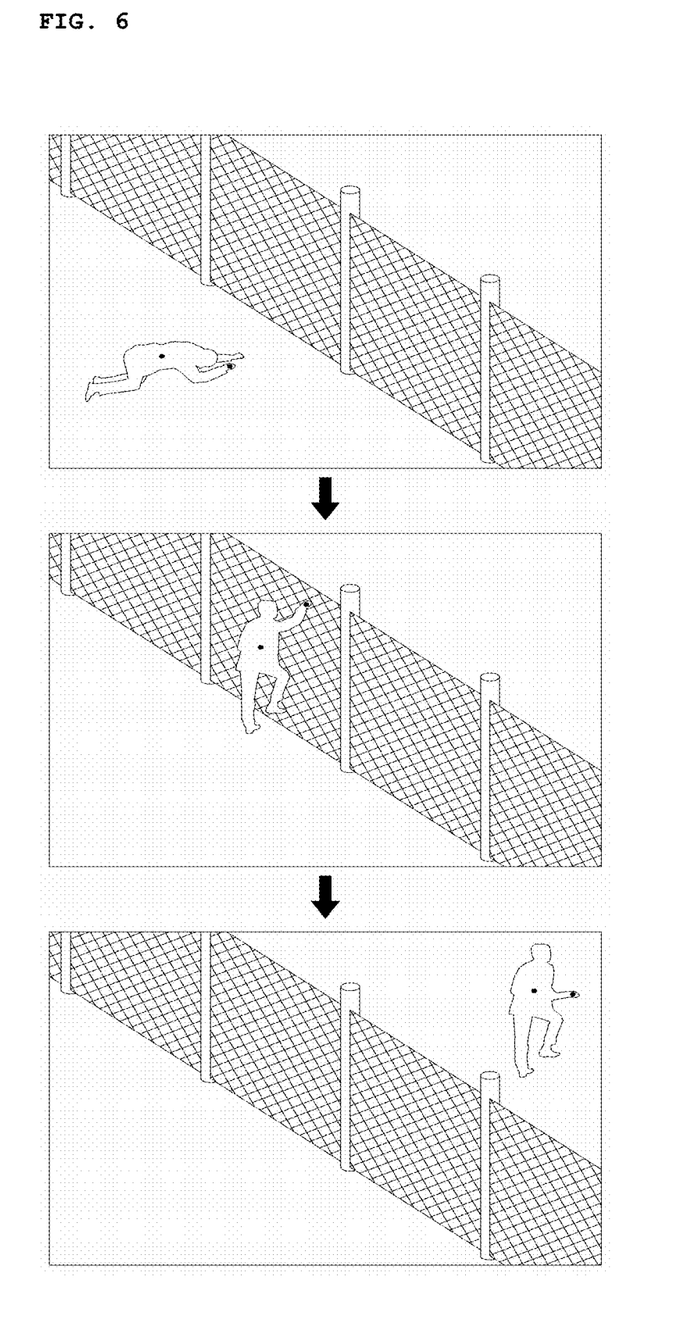
FIG. 6 is a view illustrating examples of outline images converted by an image conversion unit 17 illustrated in FIG. 2.

FIG. 6 is a diagram illustrating examples of outline images converted by the image conversion unit 17 illustrated in FIG. 2. Referring to FIG. 6, a first outline image includes an outline of a person lying face down in front of a fence, a second outline image includes an outline of a person standing while holding the fence, and a third outline image includes an outline of a person walking in a region behind the fence. The three outline images represent an event in which a person climbs over a fence. In each outline image, one dot is marked on the center of the person, and one dot is marked on the right hand. Only a movement trajectory of a central part of the person may be input to the second CNN 1100, or a movement trajectory of the right hand of the person may be input together with the movement trajectory of the central part of the person.

When only the movement trajectory of the central part of the person is input to the second CNN 1100, an intrusion occurrence probability based on one movement trajectory is output, and thus, processing speed of each frame of the second CNN 1100 may be increased, whereas accuracy of the intrusion occurrence probability is reduced. When the movement trajectory of the central part of the person and the movement trajectory of the person's right hand are input to the second CNN 1100, an intrusion occurrence probability based on the two movement trajectories is output, and thus, the processing speed of each frame of the second CNN 1100 is increased, whereas the accuracy of the intrusion occurrence probability increases. The former may determine whether or not a person intrudes in an event that the person crosses over a fence but may not distinguish between an event in which a person abnormally through a fence by damaging part of the fence. Because a movement trajectory of the right hand is different when a person opens a fence gate and when a person damages part of a fence, the latter may determine whether or not a person intrudes in all the events described above.

In step 310, the control unit 112 adjusts the number of movement trajectories of each part input to the second CNN 1100 according to the processing time of each frame of the second CNN 1100 required to acquire the intrusion occurrence probability in step 39. Referring to FIG. 5, the control unit 112 calculates the processing time of each frame of the second CNN 1100 from a difference between a point in time "T5" at which the movement trajectory of each part generated in step 37 is input to the second CNN 1100 and a point in time "T6" at which a probability of the movement trajectory of each part is output from the second CNN 1100 in step 34, and adjusts the number of movement trajectories of each part input to the second CNN 1100 in inverse proportion to the processing time of each frame of the second CNN 1100 calculated as described above. As soon as the number of movement trajectories of each part input to the second CNN 1100 is adjusted by the control unit 112, the intrusion detection unit 110 inputs the adjusted number of movement trajectories of each part to the second CNN 1100.

Accordingly, in the present embodiment, accuracy of intrusion detection may be precisely adjusted according to hardware specifications of the surveillance camera 10 such that an intrusion occurrence probability for an image obtained by capturing the surveillance region may be acquired with the highest accuracy in real time. Here, the movement trajectory of each part indicates a movement trajectory of each part of each frame, that is, a movement trajectory using each frame as the last frame, and thus, processing time of each frame of the second CNN 1100 may be calculated.

That is, when the processing time of each frame of the second CNN 1100 is within a reference time range of the second CNN 1100, the control unit 112 maintains the current number of movement trajectories of each part input to the second CNN 1100 and, when the processing time of each frame of the second CNN 1100 is greater than the reference time range of the second CNN 1100, the control unit 112 removes any one of the movement trajectories of each part input to the second CNN 1100 according to priority, and when the processing time of each frame of the second CNN 1100 is less than the reference time range of the second CNN 1100, the control unit 112 adds a movement trajectory of a new part according to the priority to the movement trajectory of each part input to the second CNN 1100. The priority is assigned to each part of the object, and the movement trajectories of each part are added or removed in the order of the priority. For example, the priority may be high in the order of a central part, the right hand, the right foot, the left hand, and the left foot of a person. Here, the reference time range of the second CNN 1100 is set such that not only real-time intrusion detection is possible for a color image of 60 frames per second generated by the ISP 13 but also the most movement trajectories may be input to the second CNN 1100 in consideration of hardware specifications of the surveillance camera 10.

In step 311, the control unit 112 checks whether or not the intrusion occurrence probability acquired in step 39 is 90% or more. When the intrusion occurrence probability acquired in step 39 is greater than or equal to 90%, the processing proceeds to step 312, otherwise the processing proceeds to step 313. In step 312, the control unit 112 transmits an intrusion alert message to the server 30 through the communication unit 15. The intrusion alert message may include the type of a target object, a corresponding frame number, and so on. When receiving the intrusion alert message from the surveillance camera 10, the server 30 may display intrusion together with the type of an intrusion object on a color image of a corresponding frame and may perform a voice broadcast informing the intrusion.

In step 313, the control unit 112 checks whether or not the intrusion occurrence probability acquired in step 39 is 80% or more. When the intrusion occurrence probability acquired in step 39 is 80% or more, the processing proceeds to step 314, otherwise the processing proceeds to step 315. In step 314, the control unit 112 transmits a security alert message to the server 30 through the communication unit 15. The security alert message may include the type of a target object, a corresponding frame number, and so on. When receiving the security alert message from the surveillance camera 10, the server 30 may display a security situation together with the type of an alert target object on a color image of a corresponding frame and may perform voice broadcasting informing the security situation.

In step 315, the control unit 112 checks whether or not the intrusion occurrence probability acquired in step 39 is 70% or more. When the intrusion occurrence probability acquired in step 39 is 70% or more, the processing proceeds to step 316, otherwise a procedure for a corresponding frame ends. That is, the procedure for the frame corresponding to the intrusion occurrence probability of less than 70% ends. In step 316, the control unit 112 transmits a caution alert message to the server 30 through the communication unit 15. The caution alert message may include the type of a target object, a corresponding frame number, and so on. When receiving the caution alert message from the surveillance camera 10, the server 30 may display a warning situation together with the type of the target object on a color image of a corresponding frame and may perform a voice broadcasting informing the caution situation. As the image displaying or the voice broadcasting in steps 312, 314, and 316 starts, the procedure for the corresponding frame ends.

As such, the present invention mainly is focused on desirable embodiments. Those skilled in the art to which the present invention belongs will understand that the present invention may be implemented in a modified form without departing from the essential characteristics of the present invention. Therefore, the disclosed embodiments are to be considered in an illustrative sense rather than a restrictive sense. The scope of the present invention is indicated in the claims rather than the foregoing description, and all differences within the scope equivalent thereto should be construed as being included in the present invention.

The invention claimed is:

1. An image-based real-time intrusion detection method comprising:
    a step of sampling a plurality of frames input at a first point in time;
    a step of acquiring a probability that at least one object corresponding to a type of a target object exists in an image of the respective sampled frames by using a first artificial neural network;
    a step of adjusting a sampling rate for a plurality of frames to be input at a second point in time after the first point in time according to processing time of each frame of the first artificial neural network required to acquire an existence probability of the at least one object;
    a step of selecting each of the respective sampled frames as a frame of the target object according to a magnitude of the acquired probability;
    a step of generating a movement trajectory of each object corresponding to the type of the target object from the frames selected as the frame of the target object; and
    a step of acquiring an intrusion occurrence probability from the generated movement trajectory by using a second artificial neural network,
    wherein, in the step of adjusting the sampling rate, processing time of each frame of the first artificial neural network is calculated from a difference between a point in time at which an image of the respective sampled frames is input to the first artificial neural network and a point in time at which an existence probability of at least one object in the image of each of the sampled frames is output from the first artificial neural network, and the sampling rate is adjusted in inverse proportion to the processing time of each frame of the first artificial neural network.

2. The method of claim 1, wherein, in the step of generating the movement trajectory of each object, the movement trajectory is generated by using at least one object tracking algorithm, and the adjusted sampling rate is readjusted according to processing time of each frame of the object tracking algorithm required to generate the movement trajectory.

3. The method of claim 1,
wherein, in the step of generating the movement trajectory of each object, a movement trajectory of at least one part of each object corresponding to the type of the target object is generated by using at least one object tracking algorithm, and
wherein, in the step of acquiring the intrusion occurrence probability, the intrusion occurrence probability is acquired from an output of the second artificial neural network by inputting the generated movement trajectory of each part to the second artificial neural network.

4. The method of claim 3, further comprising:
a step of adjusting the number of movement trajectories of each part input to the second artificial neural network according to processing time of each frame of the second artificial neural network required to acquire the intrusion occurrence probability.

5. The method of claim 4, wherein, in the step of adjusting the number of movement trajectories of each part, a current number of movement trajectories of each part input to the second artificial neural network is maintained when the processing time of each frame of the second artificial neural network is within a reference time range, and any one of the movement trajectories of each part input to the second artificial neural network is removed when the processing time of each frame of the second artificial neural network is greater than the reference time range, and a movement trajectory of a new part is added to the movement trajectory of each part input to the second artificial neural network when the processing time of each frame of the second artificial neural network is less than the reference time range.

6. The method of claim 1, further comprising:
a step of converting a color image of the respective sampled frames into a black-white image representing an outline of at least one object,
wherein, in the step of acquiring a probability that the at least one object exists, a probability that at least one object corresponding to a type of a target object exists in the converted black-white image is acquired by using the first artificial neural network.

7. A surveillance camera comprising:
a sampler that samples a plurality of frames input at a first point in time;
an object identification unit that acquires a probability that at least one object corresponding to a type of a target object exists in an image of the respective sampled frames by using a first artificial neural network;
a control unit that adjusts a sampling rate for a plurality of frames to be input at a second point in time after the first point in time according to processing time of each frame of the first artificial neural network required to acquire an existence probability of the at least one object and selects each of the respective sampled frames as a frame of the target object according to a magnitude of the acquired probability;
a trajectory generation unit that generates a movement trajectory of each object corresponding to the type of the target object from the frames selected as the frame of the target object; and
an intrusion detection unit that acquires an intrusion occurrence probability from the generated movement trajectory by using a second artificial neural network,
wherein processing time of each frame of the first artificial neural network is calculated from a difference between a point in time at which an image of the respective sampled frames is input to the first artificial neural network and a point in time at which an existence probability of at least one object in the image of each of the sampled frames is output from the first artificial neural network, and the sampling rate is adjusted in inverse proportion to the processing time of each frame of the first artificial neural network.

* * * * *